(12) United States Patent
Kelly et al.

(10) Patent No.: US 10,693,830 B2
(45) Date of Patent: Jun. 23, 2020

(54) METHODS, SYSTEMS, APPARATUSES AND DEVICES FOR FACILITATING LIVE STREAMING OF CONTENT ON MULTIPLE SOCIAL MEDIA PLATFORMS

(71) Applicants: Casey Kelly, Atlanta, GA (US); Kirk Brown, Atlanta, GA (US)

(72) Inventors: Casey Kelly, Atlanta, GA (US); Kirk Brown, Atlanta, GA (US)

(73) Assignee: HALO INNOVATIVE SOLUTIONS LLC, Stone Mountain, GA (US)

( * ) Notice: Subject to any disclaimer, the term of this patent is extended or adjusted under 35 U.S.C. 154(b) by 0 days.

(21) Appl. No.: 16/232,818

(22) Filed: Dec. 26, 2018

(65) Prior Publication Data

US 2019/0132275 A1    May 2, 2019

Related U.S. Application Data

(60) Provisional application No. 62/577,698, filed on Oct. 26, 2017.

(51) Int. Cl.
*H04L 12/58* (2006.01)
*H04L 29/06* (2006.01)
*H04L 29/08* (2006.01)

(52) U.S. Cl.
CPC .............. *H04L 51/32* (2013.01); *H04L 51/10* (2013.01); *H04L 63/08* (2013.01); *H04L 67/06* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 2006/0068818 A1* | 3/2006 | Leitersdorf | ............ | H04H 20/18 455/466 |
| 2014/0289327 A1* | 9/2014 | Hart | ...................... | H04L 65/403 709/204 |
| 2015/0245095 A1* | 8/2015 | Gonzalez | ........... | H04N 21/4542 725/28 |
| 2015/0370908 A1* | 12/2015 | Grinev | .................. | G06F 3/0482 707/722 |
| 2017/0155740 A1* | 6/2017 | Liu | ........................ | H04L 67/327 |

* cited by examiner

*Primary Examiner* — Angela Nguyen

(57) ABSTRACT

Disclosed herein is a system for facilitating posting of content on multiple social media platforms, in accordance with some embodiments. Accordingly, the system may include a communication device configured for receiving digital content from a source user device. Further, the communication device may be configured for receiving a plurality of target identifiers from the source user device. Further, the communication device may be configured transmitting a plurality of digital content to the plurality of social media servers. Further, the system may include a processing device configured for identifying a plurality of social media servers associated with the plurality of target identifiers. Further, the processing device may be configured for processing the digital content based on a plurality of platform characteristics corresponding to the plurality of social media servers. Further, the processing device may be configured for generating the plurality of digital content based on the processing.

14 Claims, 12 Drawing Sheets

METHODS, SYSTEMS, APPARATUSES AND DEVICES FOR FACILITATING LIVE STREAMING OF CONTENT ON MULTIPLE SOCIAL MEDIA PLATFORMS

The current application claims a priority to the U.S. Provisional Patent application Ser. No. 62/577,698 filed on Oct. 26, 2017.

TECHNICAL FIELD

Generally, the present disclosure relates to the field of data processing. More specifically, the present disclosure relates to methods, systems, apparatuses and devices for facilitating live streaming and/or posting of content on multiple social media platforms.

BACKGROUND

Existing techniques for posting (and/or live streaming) content (such as pictures or videos) on social media platforms are deficient with regard to several aspects. For instance, current technologies do not allow the user to post (such as provide live streaming of videos) on more than one platform at the same time. Furthermore, current technologies do not allow user to select individuals (such as followers on Facebook™, Instagram™, or Twitter™ etc.) with whom the user may want to share the live stream video irrespective of the social media platform on which the individual may be present.

Therefore, there is a need for improved methods, systems, apparatuses and devices for facilitating posting of content on multiple social media platforms that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating live streaming of content on multiple social media platforms, in accordance with some embodiments. Accordingly, the method may include a step of receiving, using a communication device, digital content from a source user device. Further, the method may include a step of receiving, using the communication device, a plurality of target identifiers from the source user device. Further, the method may include a step of identifying, using the processing device, a plurality of social media servers associated with the plurality of target identifiers. Further, the method may include a step of processing, using the processing device, the digital content based on a plurality of platform characteristics corresponding to the plurality of social media servers. Further, the method may include a step of generating, using the processing device, a plurality of digital content based on the processing. Further, the method may include a step of transmitting, using the communication device, the plurality of digital content to the plurality of social media servers.

Further disclosed herein is a system for facilitating live streaming of content on multiple social media platforms, in accordance with some embodiments. Accordingly, the system may include a communication device configured for receiving digital content from a source user device. Further, the communication device may be configured for receiving a plurality of target identifiers from the source user device. Further, the communication device may be configured transmitting a plurality of digital content to the plurality of social media servers. Further, the system may include a processing device configured for identifying a plurality of social media servers associated with the plurality of target identifiers. Further, the processing device may be configured for processing the digital content based on a plurality of platform characteristics corresponding to the plurality of social media servers. Further, the processing device may be configured for generating the plurality of digital content based on the processing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
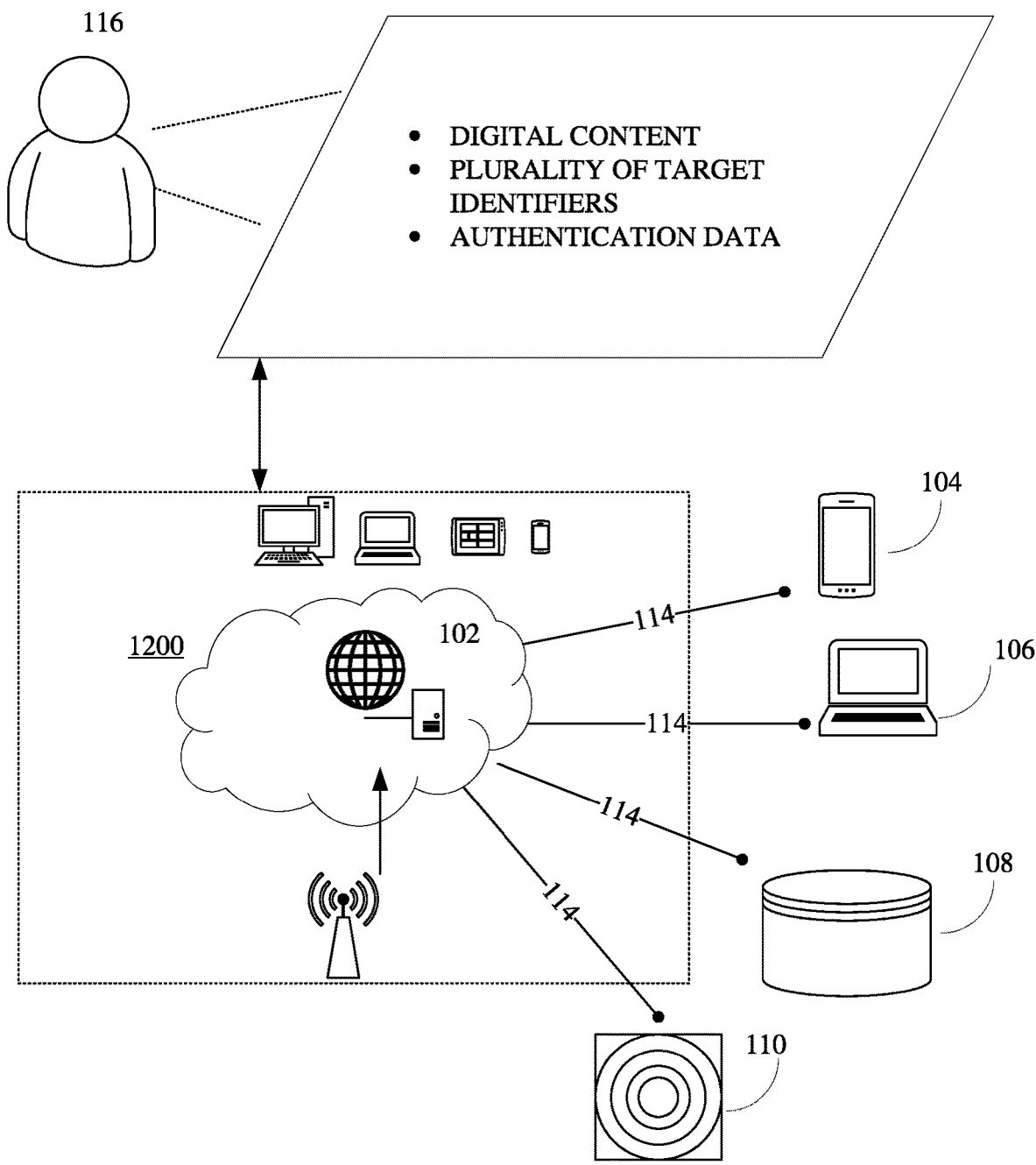
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of live streaming of content on multiple social media platforms, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively. and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure, in an instance, may include an application programming interface (API) platform. An end user may communicate with the API platform via the following process steps:

1. End User downloads HALO LIVE application on a device (such as a smartphone, a laptop, a desktop, a tablet, smart TV, or smartwatch.)

2. User setups account and creates a profile.

3. User links/connects other social media accounts associated with the user (such as Facebook™, Snapchat™, Instagram™, YouTube™, WhatsApp™, WeChat™, Beebo™, and IMOapp™) to HALO LIVE application giving the application permission to access other social media accounts associated with the user for streaming and post functionalities. HALO LIVE application is now able to trigger/start the live streaming functions of the other connected social media applications.

4. HALO LIVE allows User to enable the front and back camera of device if the device has both cameras.

5. User logins to a homepage of HALO LIVE application which may be a rotatable fours cube. The four sides of the cube consist of a Profile Page, Live Stream Page, Posting Page, and a Discovery Page.

6. The User may go to the live stream page of the HALO LIVE application where the user may be able to select and deselect other social media applications want or don't want to Go Live with. The User may also be able to select All Users or Individual Users that may be viewing/watching them before or while they are live streaming.

7. Users may change their background image/scene before the user may Go Live utilizing HALO LIVE's applications background altering filters.

8. Now the User may be ready to live stream and receive real-time comments from viewers across all platforms that may be linked to their HALO LIVE application account.

9. Viewers watching End User's live stream from HALO LIVE application may notify/invite their followers and other social media followers of the live stream they are watching so they have an option of tuning in to the live stream broadcast.

Referring now to figures, FIG. 1 is an illustration of an online platform 100 consistent with various embodiments of the present disclosure. By way of non-limiting example, the online platform 100 to facilitate live streaming of content on multiple social media platforms may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensors 110 and actuators (not shown) over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device 1200.

Figure 2:
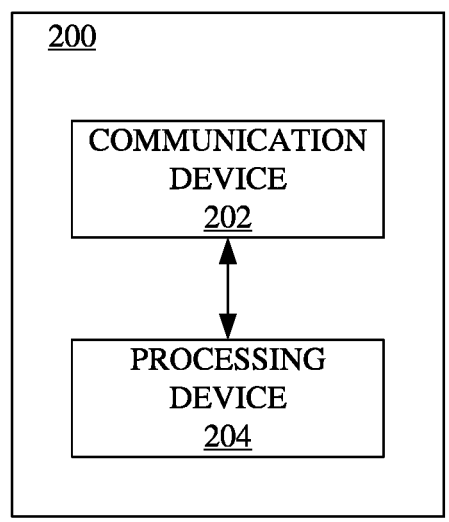
FIG. 2 shows a system of facilitating live streaming of content on multiple social media platforms, in accordance with some embodiments.

FIG. 2 shows a system 200 of facilitating posting of content on multiple social media platforms, in accordance with some embodiments. In some embodiments, the posting may include live streaming. Further, the multiple social media platforms, in an instance, may include platforms such as (but not limited to) Facebook™, Twitter™, Instagram™, Snapchat™, Whatsapp™, WeChat™, Beebo™, IMOapp™, Reddit™ etc.

Further, the system 200 may include a communication device 202 configured for receiving digital content from a source user device. Further, the digital content, in an instance, may be any content in a digital form that the user may wish to use for the live streaming on the multiple social media platforms. Further, the digital content may include, but is not limited to, one or more of audio content, video content, textual content, multimedia content and sensor data. Further, the source user device, in an instance, may be any device that may be configured to broadcast the digital content on the plurality of social media platforms. In some embodiments, the digital content may include live digital content. Further, the source user device may include at least one content capturing device configured for generating the digital content. Further, the at least one content capturing device, in an instance, may include devices such as, but not limited to, smartphones, laptops. PCs, smart watches etc. that may include a camera, a microphone and one or more sensors configured to capture physical, chemical and/or biological variables. Further, the digital content, in an instance, may be pre-recorded and/or live. For instance, the digital content may include an audio-visual recording of a presentation, or may include an audio-visual movie. In another instance, the live digital content may include a live stream of audio and/or video data captured live by the source user device such as a smartphone. Further, in some embodiments, the at least one content capturing device may include a plurality of cameras. Further, the plurality of cameras may include a front camera and a rear camera. For instance, a user may select the front camera and/or the back camera of the content capturing device in order to capture the digital content.

Further, the communication device 202 may be configured for receiving a plurality of target identifiers from the source user device. Further, the target identifiers, in an instance, may be attributes that may reflect something of interest with regard to users and/or social media platforms with which the source user device may wish to share the digital content. Further, in some embodiments, the plurality of target identifiers may include a plurality of social media platform identifiers corresponding to a plurality of social media platforms. For instance, the plurality of social media platform identifiers may include names associated with the plurality of social media platforms (such as, but not limited to, Facebook™, Twitter™, Instagram™, Snapchat™, Whatsapp™, WeChat™, Beebo™, IMOapp™, Reddit™ etc.) with which the source user device may share the digital content. Further, the plurality of target identifiers corresponds to a plurality of target user devices. Further, the target user devices, in an instance, may be devices associated with a target audience. The target audience, in an instance, may be a group of users (and/or consumers) at which the digital content (such as the live digital content) may be aimed. Further, in some embodiments, a first target user device of the plurality of target user devices may be associated with a first social media platform of the plurality of social media platforms. Further, a second target user device of the plurality of target user devices may be associated with a second social media platform of the plurality of social media platforms. For instance, in a case when a consumer (such as an individual that may be consuming that digital content) may access the plurality of social media platforms through the plurality of target user devices, then (in an instance) the first target user device may include a laptop through which the consumer may access the first social media platform (such as Facebook™), whereas, the second target user device may include a smartphone through which the consumer may access the second social media platform (such as Instagram).

Further, in some embodiments, the plurality of target identifiers may include a plurality of user identifiers associated with a plurality of social media platforms. For instance, the plurality of user identifiers may include names (such as "user names") of one or more users associated with the plurality of social media platforms (such as, but not limited to. Facebook™, Twitter™, Instagram™, Snapchat™, Whatsapp™, WeChat™, Beebo™, IMOapp™, Reddit™ etc.). Further, a first user identifier of the plurality of user identifiers may be associated with a first social media platform of the plurality of social media platforms. Further, a second user identifier of the plurality of user identifiers may be associated with a second social media platform of the plurality of social media platforms. For instance, in a case when a user may have multiple accounts with multiple "user names" for the plurality of social media platforms, then (in an instance) the first user identifier may include a user name of the user associated with the first social media platform (such as Facebook™), whereas, the second user identifier may include another "user name" of the same user associated with the second social media platform (such as Instagram™).

Further, the communication device 202 may be configured for transmitting a plurality of digital content to a plurality of social media servers. Further, the plurality of social media servers, in an instance, may be servers associated with the plurality of social media platforms. Further, in some embodiments, the plurality of digital content may include a plurality of live digital content. For instance, the plurality of digital content (such as a live video) generated from the source user device may be streamed live on the plurality of social media platforms such as Facebook™, Instagram™, and/or Twitter™ in the real-time.

Further, the system 200 may include a processing device 204 configured for identifying the plurality of social media servers associated with the plurality of target identifiers. For instance, if the target identifiers may reflect names associated with the plurality of social media platforms on which a user may wish to broadcast the digital content (such as the live digital content), then the system 200 may identify the plurality of social media servers of the plurality of social media platforms based on the target identifiers. Further, in another instance, if the target identifier may reflect user names associated with consumers that may be allowed to consume (such as watch) the digital content (such as the live digital content), then the system 200 may identify the plurality of social media servers of the plurality of social media platforms based on the target identifiers (such as the user names associated with the consumers). Further, the processing device 204 may be configured for processing the digital content based on a plurality of platform characteristics corresponding to the plurality of social media servers. Further, the platform characteristics, in an instance, may be features associated with the plurality of social media servers. For instance, the platform characteristics may include features such as (but not limited to) a type of compression technique used for compressing the digital content on a social media server, a type of digital content that may be allowed on the social media servers, a size constraint (such as in Bytes) associated with the digital content that may be allowed on the social media servers etc. Further, in some embodiments, the plurality of platform characteristics may include a plurality of content formats. Further, the processing may include transforming the digital content into the plurality of digital content based on the plurality of content formats. For instance, the digital content (such as a video) that may be captured by the content capturing device (such as a smartphone) may be captured in an MPEG4 format that may be converted into a format that may be supported by the plurality of social media server (such as a Facebook's server). Further, the processing device 204 may be configured for generating the plurality of digital content based on the processing.

Further, in some embodiments, the communication device 202 may be configured for receiving a plurality of authentication data from the source user device. Further, each authentication data of the plurality of authentication data, in an instance, may be any data that may reflect an identity of a user that may wish to broadcast the digital content on the plurality of social media platforms. Further, the plurality of authentication data, in an instance, may include, but not limited to, passwords, PINs. OTPs, biometric variables etc. associated with the user. Further, the communication device 202 may be configured for transmitting the plurality of authentication data to the plurality of social media servers. Further, the plurality of social media servers may be configured for transmitting a plurality of authentication results based on the plurality of authentication data. Further, the authentication results, in an instance, may include data that may reflect an authenticity associated with the identity of the user. Further, the communication device 202 may be configured for receiving the plurality of authentication results from the plurality of social media servers. Further, the transmitting of the digital content may be based on the plurality of authentication results. For instance, if the authentication results from a social media server (such as Facebook's server) may reflect that an identity of the user (that may wish to broadcast the digital content) may not be verified (based on the authentication data), then the transmitting of the digital content to the Facebook's server by the communication device 202 may not be executed.

Further, in some embodiments, the communication device 202 may be configured for receiving a supplemental content identifier from the source user device. Further, the processing device 204 may be configured for identifying at least one supplemental content based on the supplemental content identifier. In some embodiments, the at least one supplemental content may include one or more of a background visual content and a background audio content. Further, the processing device 204 may be configured for embedding the at least one supplemental content in the digital content. For instance, the user may provide the supplemental content identifier (such as providing an indication by interacting with the source user device) in order to change a background scene before broadcasting the digital content (such as a live video content).

Further, in some embodiments, the communication device 202 may be configured for receiving a plurality of user feedback from the plurality of target user devices. Further, the plurality of user feedback, in an instance, may include responses provided by the target audience (through the plurality of target user devices) as a reaction to the digital content that may be broadcasted by the source user device. Further, the plurality of user feedback, in an instance, may be available in (but not limited to) a textual form (such as comments), and/or in a visual form (such as emoticons, GIFs, pictures etc.). Further, the communication device 202 may be configured for transmitting an integrated user feedback to the source user device. Further, the integrated user feedback, in an instance, may include an organized collection of all the plurality of user feedback received from the plurality of target user devices. For instance, in a case when a first user may be providing a comment (as a reaction to the digital content such as a live stream video) from a social media platform (such as Facebook™) and/or a second user may be providing a visual response (such as providing a "heart" variable) from another social media platform (such as Twitter™), then the integrated user feedback may include both responses from both the users (including information such as what feedback may be provided by which user and/or from which social media platform). Further, the source user device may be configured for presenting the integrated user feedback. Further, the processing device 204 may be configured for generating the integrated user feedback based on the plurality of user feedback.

Further, in some embodiments, the communication device 202 may be configured for receiving a source indication associated with the digital content. Further, the communication device 202 may be configured for transmitting a content request to a source server. Further, the communication device 202 may be configured for receiving the digital content from the source server. Further, the processing device 204 may be configured for identifying the source server based on the source indication.

Figure 3:
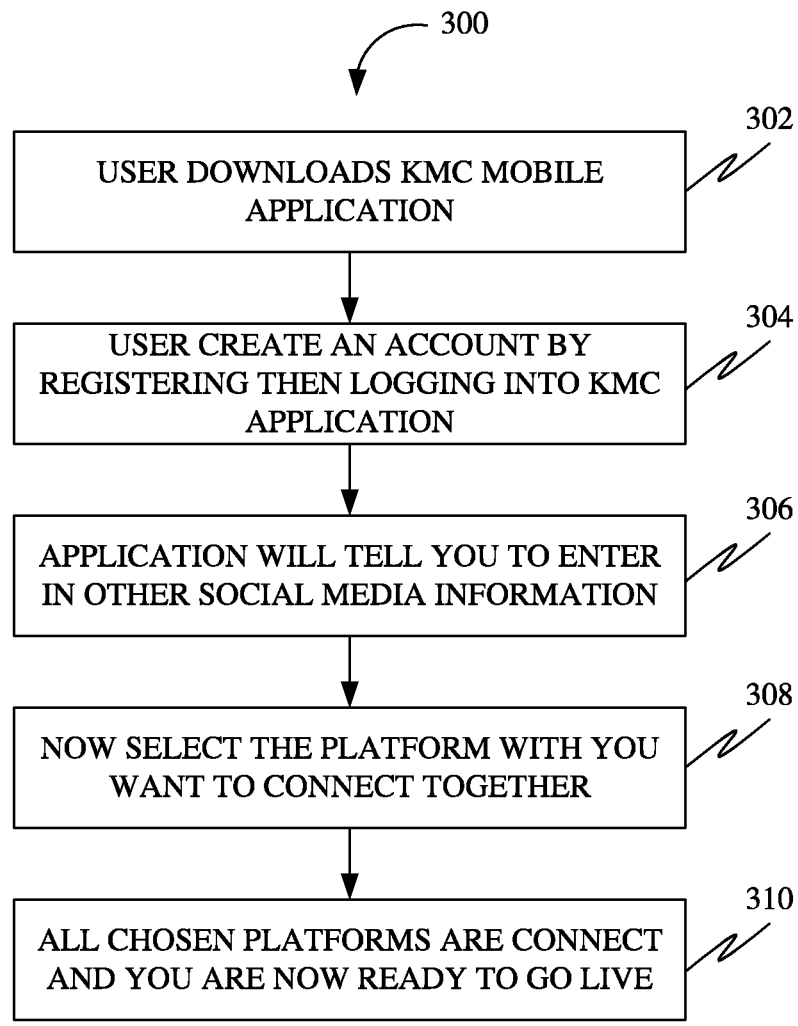
FIG. 3 is a flowchart of a method to facilitate accessing a HALO LIVE application programming interface (API) on the source user device for broadcasting the digital content on the plurality of social media and/or live streaming platforms, in accordance with some embodiments.

FIG. 3 is a flowchart of a method 300 to facilitate accessing a HALO LIVE application programming interface (API) on the source user device for broadcasting the digital content on the plurality of social media platforms, in accordance with some embodiments. Accordingly, at 302, the method 300 may include downloading HALO LIVE application on the source user device. Further, the source user device, in an instance, may be any device that may be configured to broadcast the digital content on the plurality of social media platforms (such as, but not limited to, Facebook™, Twitter™, Instagram™, Snapchat™, Whatsapp™, WeChat™, Beebo™, IMOapp™, Reddit™ etc.). Further, the HALO LIVE application, in an instance, may provide an interface to a user in order to interact with the online platform 100 through the source user device. Further, the user, in an instance, may be an individual that may wish to broadcast the digital content on the plurality of social media platform in the real-time. Further, at 304, the method 300 may include creating an account on the HALO LIVE application. Accordingly, the user, in an instance, may create the account on the HALO LIVE application in order to register with the online platform 100. Further, the account associated with the user, in an instance, may be a user profile that may include information associated with the user such as (but not limited to) name, age, gender, location etc. Further, the information associated with the user, in an instance, may be stored in a database. Further, the database, in an instance, may be any storage space configured to store data in an organized form that may be accessed electronically. Further, at 306, the method 300 may include entering social media data associated with the user. Accordingly, the social media data, in an instance, may include authentication data provided by the user associated with the plurality of social media platforms in order to establish a communication between the online platform 100 and the plurality of social media servers. Further, once the user may provide the authentication data to the online platform 100 through the HALO LIVE API, the online platform 100 may request the plurality of social media servers associated with the plurality of social media platforms to authenticate and/or verify the user based on the authentication data. Further, on successful authentication, the online platform 100 may act as a proxy for the user to communicate with the plurality of social media servers at the real-time. Further, at 308, the method 300 may include selecting the plurality of social media platforms that the user may want to connect together. Accordingly, the user, in an instance, may interact with the HALO LIVE API in order to select the plurality of social media platforms. For instance, the user may select social media platforms from a list of platforms by interacting (such as clicking and/or taping) with a display panel of the source user device such as a smartphone. Further, at 310, the method 300 may include connecting the plurality of social media platforms. Accordingly, the online platform 100, in an instance, may be configured to access streaming and/or post functionalities associated with the plurality social media platforms. Further, the HALO LIVE API may now be able to trigger and/or start a live streaming function of other connected social media and/or live stream applications for the user.

Figure 4:
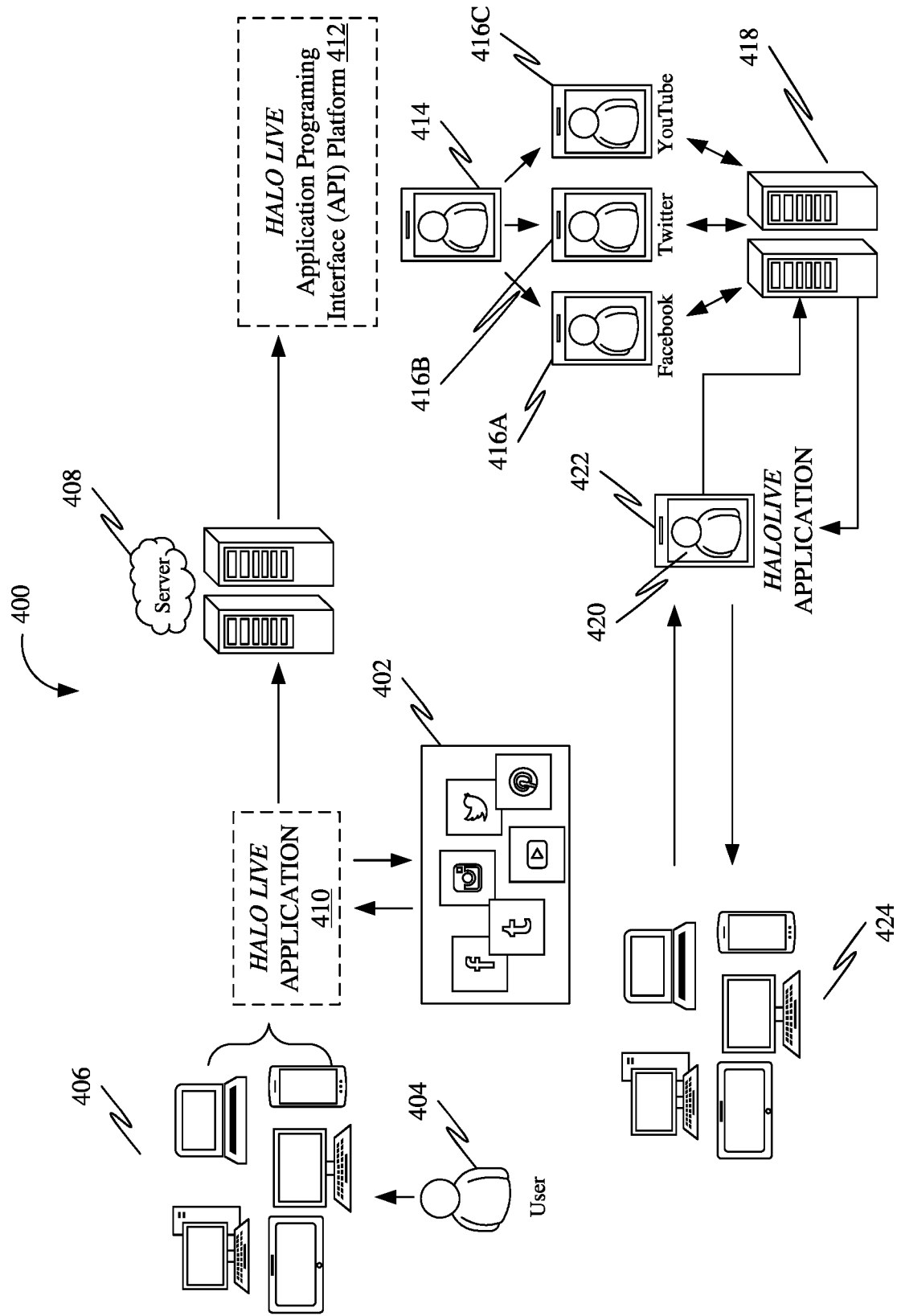
FIG. 4 is an exemplary block diagram flow representation of a HALO LIVE platform 400 to facilitate live streaming of digital content on a plurality of social media and/or live streaming platforms, in accordance with some embodiments.

FIG. 4 is an exemplary block diagram flow representation of a HALO LIVE platform 400 to facilitate live streaming of digital content on a plurality of social media platforms 402, in accordance with some embodiments. Accordingly, the plurality of social media platforms 402, in an instance, may include platforms such as (but not limited to) Facebook™, Twitter™, Instagram™, Snapchat™, Whatsapp™, WeChat™, Beebo™, IMOapp™, Reddit™ etc. Further, a user 404, in an instance, may be an individual that may wish to broadcast (and/or live stream) the digital content through a one or more of user devices 406 (such as PC, laptops, smartphones, smartwatches etc.). Further, the one or more user devices 406, in an instance, may be IoT based devices that may be configured to communicate with a server 408 through a HALO LIVE Application 410. Further, the HALO LIVE application 410, in an instance, may be configured to be supported on a one or more of operating systems such as (but not limited to) IOS, Android. Windows, Blackberry OS, Bada, Meego OS, Symbian OS, and so on. Further, the HALO LIVE application 410, in an instance, may be downloaded on the one or more user devices 406. Further, the user 404, in an instance, may create an account on the HALO LIVE application 410, or login, and/or link the plurality of social media platforms 402. Further, the account associated with the user 404, in an instance, may be a user profile that may include information associated with the user 404 such as (but not limited to) name, age, gender, location etc.

Further, the information associated with the user 404, in an instance, may be stored in a database at the server 408. Further, the database, in an instance, may be any storage space configured to store data in an organized form that may be accessed electronically. Further, the server 408, in an instance, may be an online platform that may be configured to communicate with the HALO LIVE application 410 in order to provide a HALO LIVE application programming interface (API) platform 412. Further, the HALO LIVE API platform 412, in an instance, may be configured to allow a source user device 414 to live stream the digital content that may be transmitted to a plurality of target user devices (such as target user device 416A, 416B, 416C). Further, the plurality of target user devices 416A-C, in an instance, may be devices associated with a target audience that may be using different social media platforms (such as Facebook™, Twitter™, YouTube™ etc.). The target audience, in an instance, may be a group of users (and/or consumers) at which the digital content (such as the live stream video) may be aimed.

Figure 6:
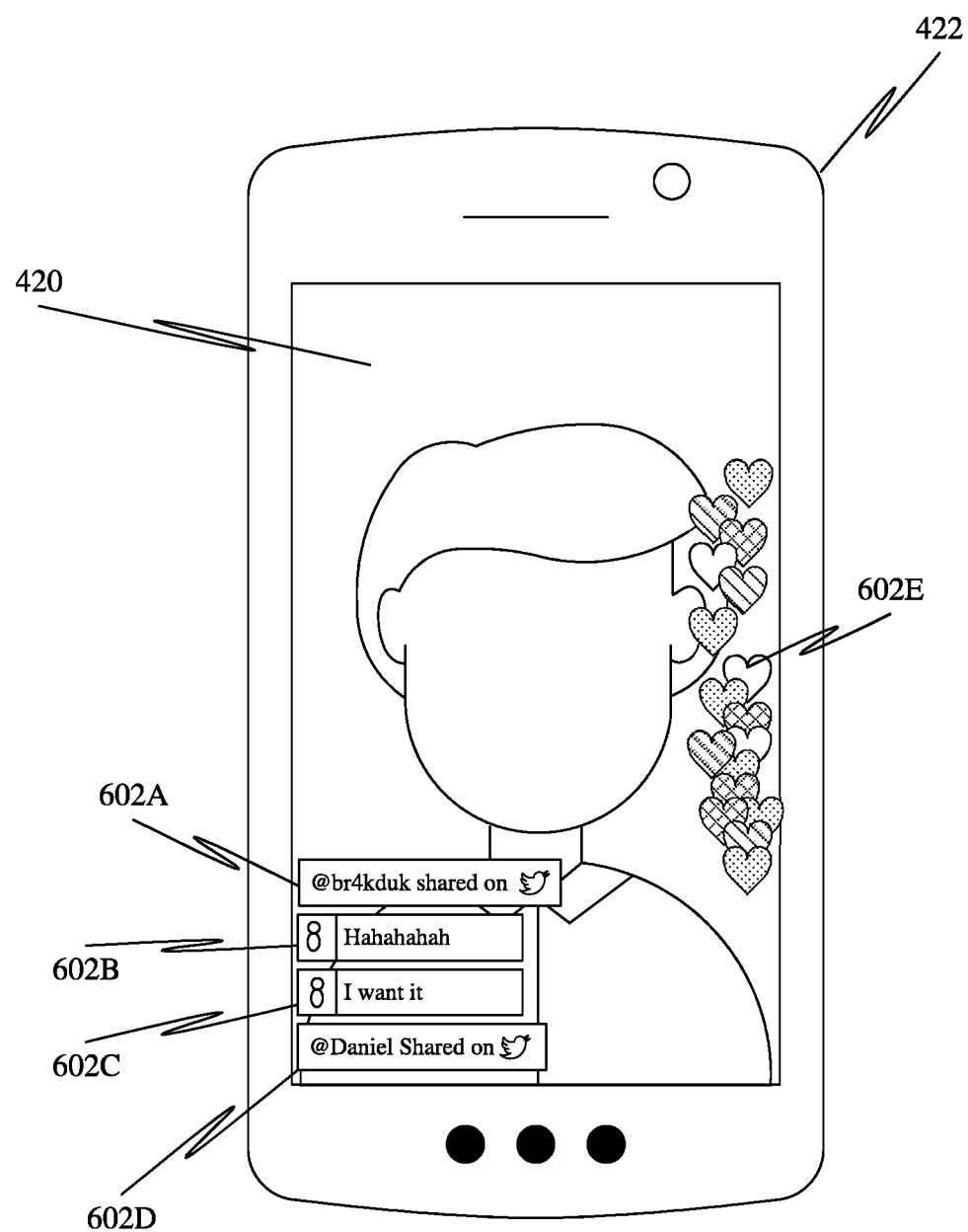
FIG. 6 shows an exemplary representation of an integrated user feedback interface on a user device, in accordance with some embodiments.

Further, the HALO LIVE platform 400, in an instance, may include an integrated user feedback server 418 that may be configured to communicate with the plurality of target user devices 416A-C in order to provide an integrated user feedback interface 420 on a user device 422 (such as a smartphone). Further, in some embodiments, the integrated user feedback server 418 may be configured for receiving a plurality of user feedback (such as user feedback 602A, 602B, 602C, 602D, 602E, as shown in FIG. 6) from the plurality of target user devices 416A-C. Further, the plurality of user feedback 602A-E, in an instance, may include responses provided by the target audience (through the plurality of target user devices 416A-C) as a reaction to the digital content that may be broadcasted by the source user device 414. Further, the plurality of user feedback 602A-E, in an instance, may be available in (but not limited to) a textual form (such as comments as shown with the user feedback 602B and 602C), and/or in a visual form (such as a heart variable as shown with the user feedback 602E). Further, the integrated user feedback server 418 may be configured for transmitting the integrated user feedback interface 420 to the user device 422. Further, the integrated user feedback interface 420, in an instance, may include an organized collection of all the plurality of user feedback received from the plurality of target user devices 416A-C. For instance, in a case when a first user may be providing a comment (as a reaction to the digital content such as a live stream video) from a social media platform (such as Facebook™) and/or a second user may be providing a visual response (such as providing a "heart" variable) from another social media platform (such as Twitter), then the integrated user feedback interface 420 may include both responses from both the users (including information such as what feedback may be provided by which user and/or from which social media platform). Further, the plurality of user feedback, in an instance, may be sent in real-time through a plurality of devices 424 (such as PC, laptops, smartphones, smartwatches etc.).

Figure 5:
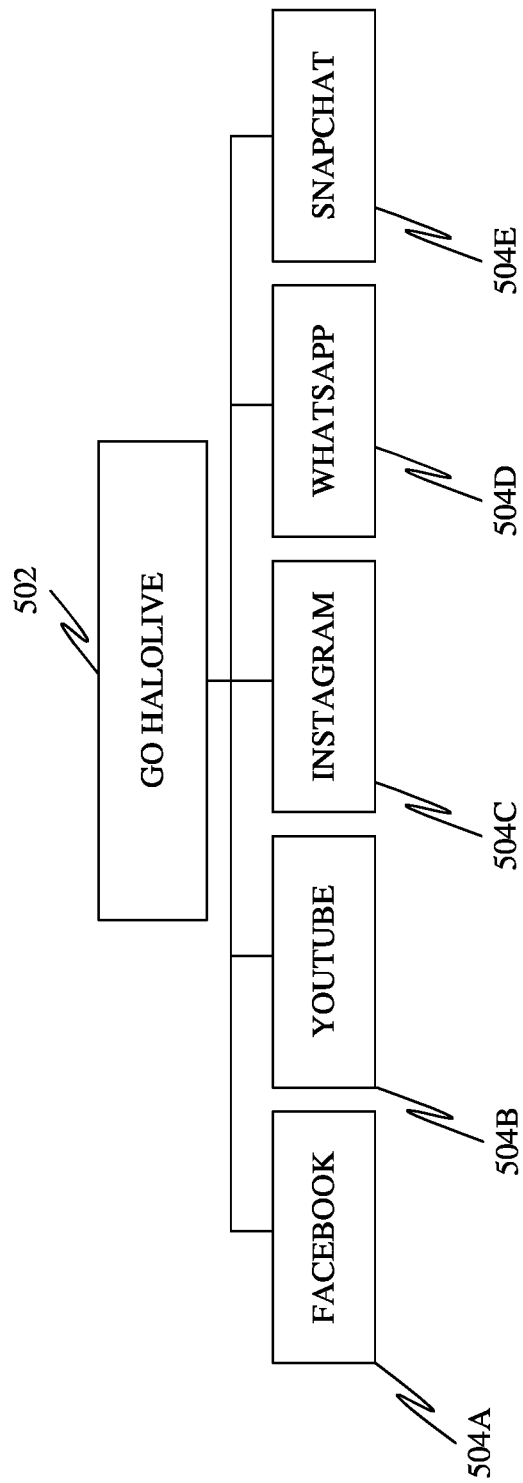
FIG. 5 shows an exemplary block diagram representation of a HALO LIVE platform that may be linked with a plurality of social media platforms, in accordance with some embodiments.

FIG. 5 shows an exemplary block diagram representation of a GO HALO LIVE platform 502 that may be linked with a plurality of social media platforms, in accordance with some embodiments. Accordingly, the plurality of social media platforms may include (but not limited to) Facebook™ 504A, YouTube™ 504B, Instagram™ 504C. Whatsapp™ 504D, SnapChat™ 504E.

Figure 7:
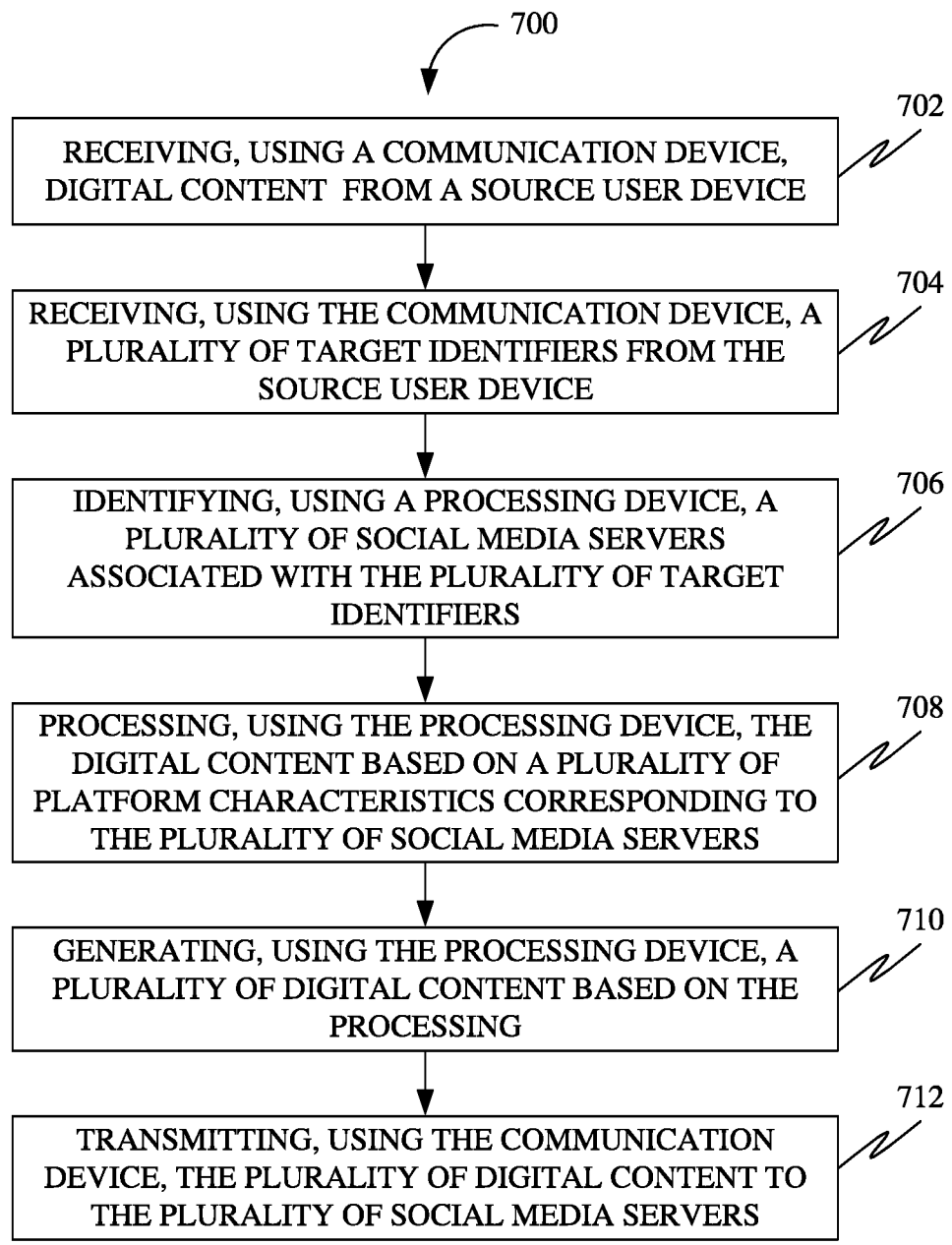
FIG. 7 is a flowchart of a method to facilitate live streaming of content on multiple social media platforms, in accordance with some embodiments.

FIG. 7 is a flowchart of a method 700 to facilitate posting of content on multiple social media platforms, in accordance with some embodiments. In some embodiments, the posting may include live streaming. Further, the multiple social media platforms, in an instance, may include platforms such as (but not limited to) Facebook™, Twitter™ Instagram™, Snapchat™, Whatsapp™, WeChat™, Beebo™, IMOapp™, Reddit™ etc. Accordingly, at 702, the method 700 may include receiving, using a communication device, digital content from a source user device. Further, the digital content, in an instance, may be any content in a digital form that the user may wish to use for the live streaming on the multiple social media platforms. Further, the digital content may include, but is not limited to, one or more of audio content, video content, textual content, multimedia content and sensor data. In some embodiments, the digital content may include live digital content. Further, the source user device may include at least one content capturing device configured for generating the digital content. Further, the at least one content capturing device, in an instance, may include devices such as, but not limited to, smartphones, laptops, PCs, smart watches etc. that may include a camera, a microphone and one or more sensors configured to capture physical, chemical and/or biological variables. Further, the digital content, in an instance, may be pre-recorded and/or live. For instance, the digital content may include an audio-visual recording of a presentation, or may include an audio-visual movie. In another instance, the live digital content may include a live stream of audio and/or video data captured live by the source user device such as a smartphone. Further, in some embodiments, the at least one content capturing device may include a plurality of cameras. Further, the plurality of cameras may include a front camera and a rear camera. For instance, a user may select the front camera and/or the back camera of the content capturing device in order to capture the digital content.

Further, at 704, the method 700 may include receiving, using the communication device, a plurality of target identifiers from the source user device. Further, the target identifiers, in an instance, may be attributes that may reflect something of interest with regard to users and/or social media platforms with which the source user device may wish to share the digital content. Further, in some embodiments, the plurality of target identifiers may include a plurality of social media platform identifiers corresponding to a plurality of social media platforms. For instance, the plurality of social media platform identifiers may include names associated with the plurality of social media platforms (such as, but not limited to, Facebook™, Twitter™, Instagram™, Snapchat™, Whatsapp™, WeChat®, Beebo™, IMOapp™, Reddit™ etc.) with which the source user device may share the digital content. Further, the plurality of target identifiers corresponds to a plurality of target user devices. Further, the target user devices, in an instance, may be devices associated with a target audience. The target audience, in an instance, may be a group of users (and/or consumers) at which the digital content (such as the live digital content) may be aimed. Further, in some embodiments, a first target user device of the plurality of target user devices may be associated with a first social media platform of the plurality of social media platforms. Further, a second target user device of the plurality of target user devices may be associated with a second social media platform of the plurality of social media platforms. For instance, in a case, when a consumer (such as an individual that may be consuming that digital content) may access the plurality of social media platforms through the plurality of target user devices, then (in an instance) the first target user device may include a laptop through which the consumer may access the first social media platform (such as Facebook™), whereas, the second target user device may include a smartphone through which the same consumer may access the second social media platform (such as Instagram). Further, in some embodiments, the plurality of target identifiers may include a plurality of user identifiers associated with a plurality of social media platforms. For instance, the plurality of user identifiers may include names (such as "user names") of one or more users associated with the plurality of social media platforms (such as, but not limited to. Facebook™, Twitter™ Instagram™, Snapchat™, Whatsapp™, WeChat™, Beebo™. IMOapp™, Reddit™ etc.). Further, a first user identifier of the plurality of user identifiers may be associated with a first social media platform of the plurality of social media platforms. Further, a second user identifier of the plurality of user identifiers may be associated with a second social media platform of the plurality of social media platforms. For instance, in a case when a user may have multiple accounts with multiple "user names" for the plurality of social media platforms, then (in an instance) the first user identifier may include a user name of the user associated with the first social media platform (such as Facebook™), whereas, the second user identifier may include another "user name" of the same user associated with the second social media platform (such as Instagram).

Further, at 706, the method 700 may include identifying, using a processing device, a plurality of social media servers associated with the plurality of target identifiers. Accordingly, the plurality of social media servers, in an instance, may be servers associated with the plurality of social media platforms. For instance, if the target identifiers may reflect names associated with the plurality of social media platforms on which a user may wish to broadcast the digital content (such as the live digital content), then the online platform 100 (FIG. 1) may identify the plurality of social media servers of the plurality of social media platforms based on the target identifiers. Further, in another instance, if the target identifier may reflect user names associated with consumers that may be allowed to consume (such as watch) the digital content (such as the live digital content), then the online platform 100 may identify the plurality of social media servers of the plurality of social media platforms based on the target identifiers (such as the user names associated with the consumers).

Further, at 708, the method 700 may include processing, using the processing device, the digital content based on a plurality of platform characteristics corresponding to the plurality of social media servers. Further, the platform characteristics, in an instance, may be features associated with the plurality of social media servers. For instance, the platform characteristics may include features such as (but not limited to) a type of compression technique used for compressing the digital content on a social media server, a type of digital content that may be allowed on the social media servers, a size constraint (such as in Bytes) associated with the digital content that may be allowed on the social media servers etc.

Further, at 710, the method 700 may include generating, using the processing device, a plurality of digital content based on the processing. In some embodiments, the plurality of digital content may include a plurality of live digital content. Accordingly, the plurality of digital content, in an instance, may be a multiple copies of the digital content as per the plurality of platform characteristics corresponding to the plurality of social media servers.

Further, at 712, the method 700 may include transmitting, using the communication device, the plurality of digital content to the plurality of social media servers. Accordingly, the online platform 100, in an instance, may be configured to transmit the plurality of digital content to the plurality of social media servers through a wireless transmitter. The wireless transmitter, in an instance, may transmit the plurality of digital content over, but not limited to, a Wi-Fi, a Bluetooth, an electromagnetic waveform, ultra-sound, cellular (5G) and/or an Infra-red etc.

Further, in some embodiments, the plurality of platform characteristics may include a plurality of content formats. Further, the processing may include transforming the digital content into the plurality of digital content based on the plurality of content formats. For instance, the digital content (such as a video) that may be captured by the content capturing device (such as a smartphone) may be captured in an MPEG4 format that may be converted into a format that may be supported by the plurality of social media server (such as a Facebook's server, and/or a Twitter's server).

Figure 8:
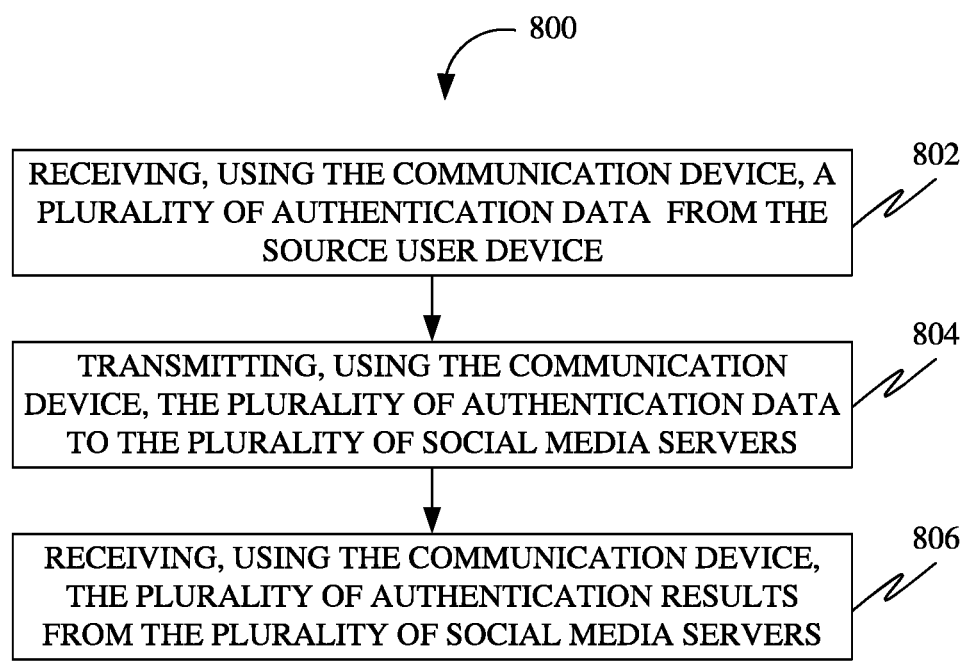
FIG. 8 is a flowchart of a method to facilitate authenticating the source user device for the plurality of social media servers, in accordance with some embodiments.

FIG. 8 is a flowchart of a method 800 to facilitate authenticating the source user device for the plurality of social media servers, in accordance with some embodiments. Accordingly, at 802, the method 800 may include receiving, using the communication device, a plurality of authentication data from the source user device. Further, each authentication data of the plurality of authentication data, in an instance, may be any data that may reflect an identity of a user that may wish to broadcast the digital content on the plurality of social media platforms. Further, the plurality of authentication data, in an instance, may include, but not limited to, passwords, PINs, OTPs, biometric variables etc. associated with the user.

Further, at 804, the method 800 may include transmitting, using the communication device, the plurality of authentication data to the plurality of social media servers. Further, the plurality of social media servers may be configured for transmitting a plurality of authentication results based on the plurality of authentication data. Accordingly, the authentication results, in an instance, may include data that may reflect an authenticity associated with the identity of the user.

Further, at 806, the method 800 may include receiving, using the communication device, the plurality of authentication results from the plurality of social media servers. Further, the transmitting of the digital content may be based on the plurality of authentication results. For instance, if the authentication results from a social media server (such as Facebook's server) may reflect that an identity of the user (that may wish to broadcast the digital content) may not be verified (based on the authentication data), then the transmitting of the digital content to the Facebook's server by the communication device 202 may not be executed.

Figure 9:
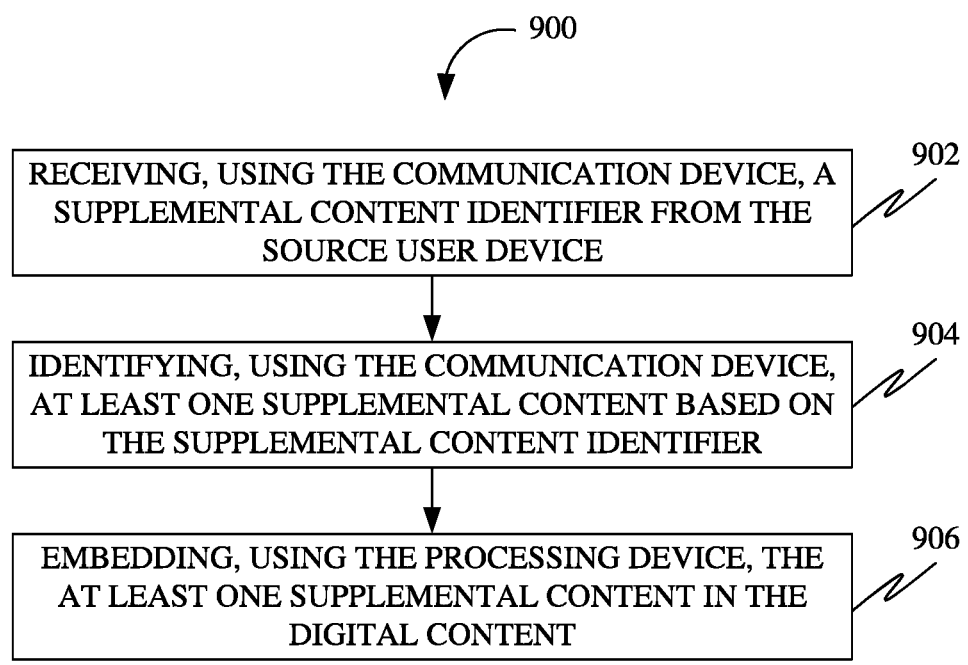
FIG. 9 shows a flowchart of a method to facilitate providing supplemental content in the digital content, in accordance with some embodiments.

FIG. 9 shows a flowchart of a method 900 to facilitate providing supplemental content in the digital content, in accordance with some embodiments. Accordingly, at 902, the method 900 may include receiving, using the communication device, a supplemental content identifier from the source user device. Further, at 904, the method 900 may include identifying, using the communication device, at least one supplemental content based on the supplemental content identifier. In some embodiments, the at least one supplemental content may include one or more of a background visual content and a background audio content. Further, at 906, the method 900 may include embedding, using the processing device, the at least one supplemental content in the live digital content. For instance, the user may provide the supplemental content identifier (such as providing an indication by interacting with the source user device) in order to change a background scene before broadcasting the digital content (such as a live video content).

Figure 10:
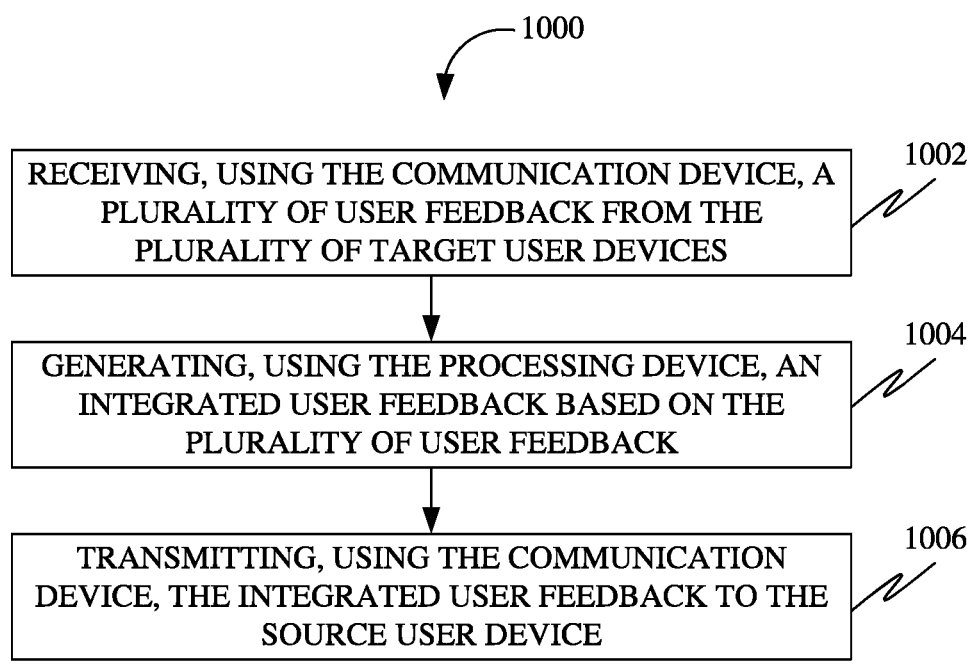
FIG. 10 shows a flowchart of a method to facilitate providing an integrated user feedback to the source user device, in accordance with some embodiments.

FIG. 10 shows a flowchart of a method 1000 to facilitate providing an integrated user feedback to the source user device, in accordance with some embodiments. Accordingly, at 1002, the method 1000 may include receiving, using the communication device, a plurality of user feedback from the plurality of target user devices. Further, the plurality of user feedback, in an instance, may include responses provided by the target audience (through the plurality of target user devices) as a reaction to the digital content that may be broadcasted by the source user device. Further, the plurality of user feedback, in an instance, may be available in (but not limited to) a textual form (such as comments), and/or in a visual form (such as emoticons, GIFs, pictures etc.).

Further, at 1004, the method 1000 may include generating, using the processing device, an integrated user feedback based on the plurality of user feedback. Accordingly, the integrated user feedback, in an instance, may include an organized collection of all the plurality of user feedback received from the plurality of target user devices. For instance, in a case when a first user may be providing a comment (as a reaction to the digital content such as a live stream video) from a social media platform (such as Facebook™) and/or a second user may be providing a visual response (such as providing a "heart" variable) from another social media platform (such as Twitter), then the integrated user feedback may include both responses from both the users (including information such as what feedback may be provided by which user and/or from which social media platform).

Further, at 1006, the method 1000 may include transmitting, using the communication device, the integrated user feedback to the source user device. Further, the source user device may be configured for presenting the integrated user feedback. Accordingly, the online platform 100, in an instance, may be configured to transmit the integrated user feedback to the source user device through a wireless transmitter. The wireless transmitter, in an instance, may transmit the integrated user feedback over, but not limited to, a Wi-Fi, a Bluetooth, an electromagnetic waveform, ultrasound, cellular (5G) and/or an Infra-red etc.

Figure 11:
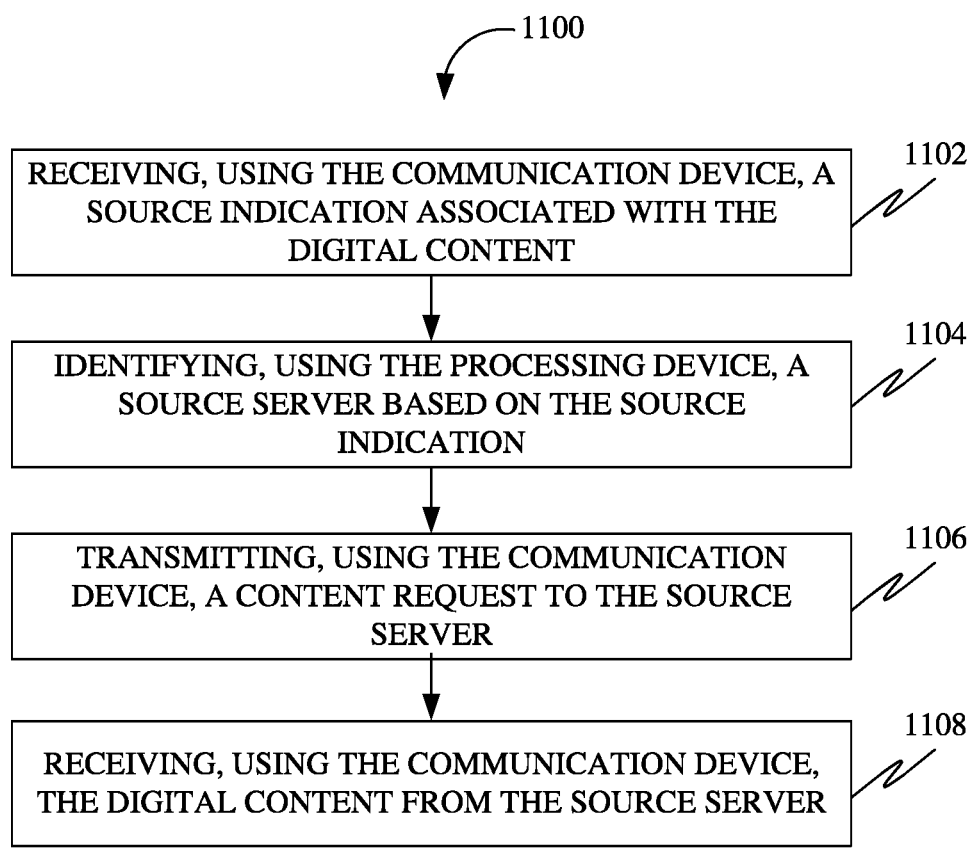
FIG. 11 is a flowchart of a method to facilitate recognizing a source server for the digital content, in accordance with some embodiments.

FIG. 11 is a flowchart of a method 1100 to facilitate recognizing a source server for the digital content, in accordance with some embodiments. Further, at 1102, the method 1100 may include receiving, using the communication device, a source indication associated with the live digital content. Accordingly, at 1104, the method 1100 may include identifying, using the processing device, a source server based on the source indication. Further, at 1106, the method 1100 may include transmitting, using the communication device, a content request to the source server. Further, at 1108, the method 1100 may include receiving, using the communication device, the digital content from the source server.

Figure 12:
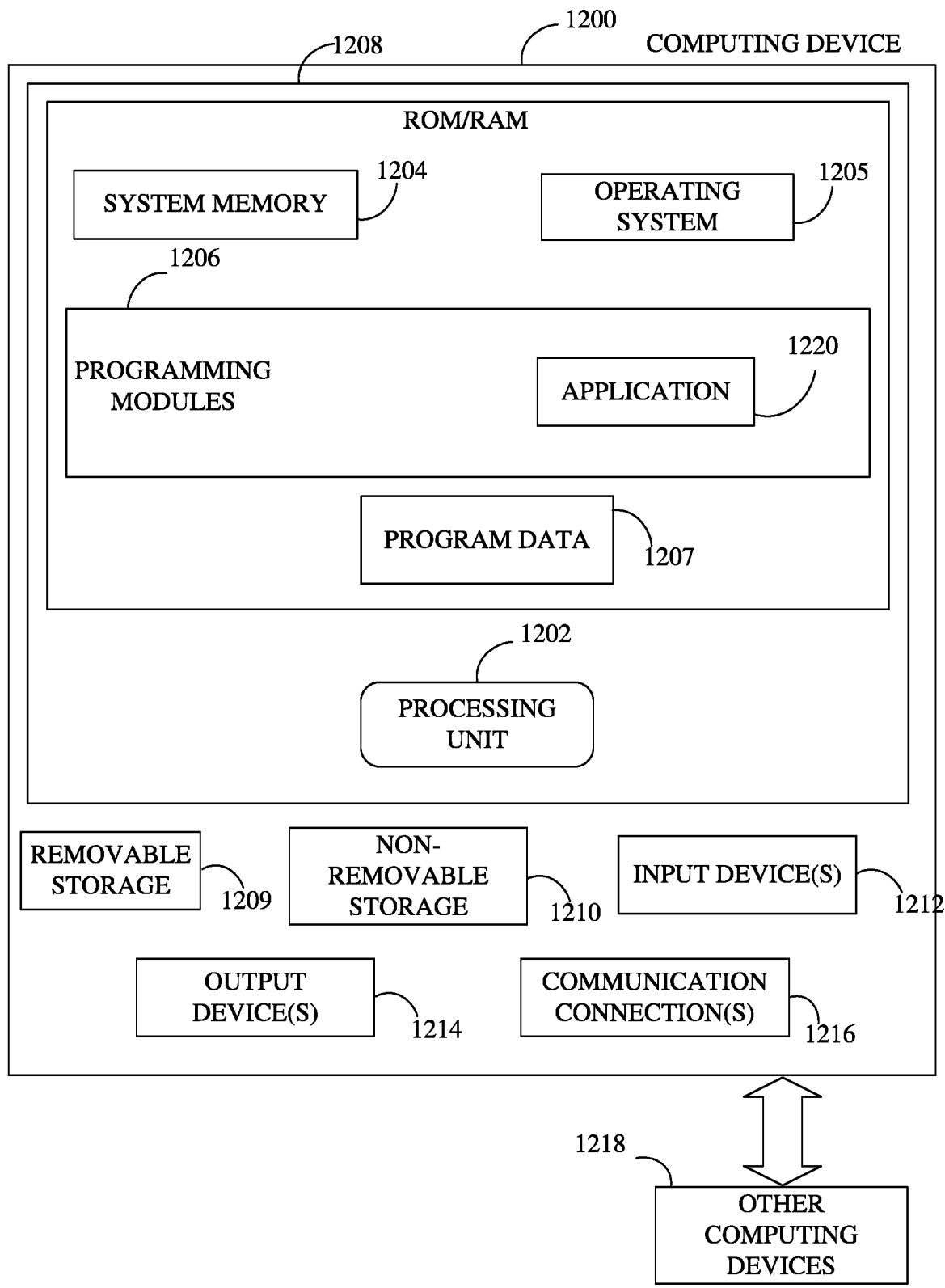
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220 such as a media player) may perform processes including, for example, one or more stages of methods, algorithms, systems, applications, servers, databases as described above. The aforementioned process is an example, and processing unit 1202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method of facilitating live streaming of content on multiple social media platforms, the method comprising:

sending, using a communication device, a digital content from a source user device, wherein the source user device comprises at least one content capturing device configured for generating the digital content;

sending, using the communication device, a supplemental content identifier from the source user device;

sending, using the communication device, a plurality of target identifiers from the source user device, wherein the plurality of target identifiers correspond to a plurality of target user devices;

identifying, using a processing device, a plurality of social media servers associated with the plurality of target identifiers;

identifying, using the processing device, a supplemental content based on the supplemental content identifier, wherein the supplemental content is a background audio content;

processing, using the processing device, the digital content based on a plurality of platform characteristics corresponding to the plurality of social media servers;

embedding, using the processing device, the supplemental content in the digital content;

generating, using the processing device, a plurality of digital content based on the processing;

transmitting, using the communication device, the plurality of digital content to the plurality of social media servers;

sending, using the communication device, a source indication associated with the digital content;

identifying, using the processing device, a source server based on the source indication;

transmitting, using the communication device, a content request to the source server; and sending, using the communication device, the digital content from the source server.

2. The method of claim 1, wherein the plurality of target identifiers comprises a plurality of social media platform identifiers corresponding to a plurality of social media platforms, wherein a first target user device of the plurality of target user devices is associated with a first social media platform of the plurality of social media platforms, wherein a second target user device of the plurality of target user devices is associated with a second social media platform of the plurality of social media platforms.

3. The method of claim 1, wherein the plurality of target identifiers comprises a plurality of user identifiers associated with a plurality of social media platforms, wherein a first user identifier of the plurality of user identifiers is associated with a first social media platform of the plurality of social media platforms, wherein a second user identifier of the plurality of user identifiers is associated with a second social media platform of the plurality of social media platforms.

4. The method of claim 1 further comprising:
sending, using the communication device, a plurality of authentication data from the source user device;
transmitting, using the communication device, the plurality of authentication data to the plurality of social media servers, wherein the plurality of social media servers is configured for transmitting a plurality of authentication results based on the plurality of authentication data; and
sending, using the communication device, the plurality of authentication results from the plurality of social media servers, wherein the transmitting of the digital content is based on the plurality of authentication results.

5. The method of claim 1, wherein the plurality of platform characteristics comprises a plurality of content formats, wherein the processing comprises transforming the digital content into the plurality of digital content based on the plurality of content formats.

6. The method of claim 1 further comprising:
sending, using the communication device, a plurality of user feedback from the plurality of target user devices;
generating, using the processing device, an integrated user feedback based on the plurality of user feedback;
transmitting, using the communication device, the integrated user feedback to the source user device, wherein the source user device is configured for presenting the integrated user feedback.

7. The method of claim 1, wherein the at least one content capturing device comprises a plurality of cameras, wherein the plurality of cameras comprises a front camera and a rear camera.

8. A system of facilitating live streaming of content on multiple social media platforms, the system comprising:
a communication device configured for:
sending a digital content from a source user device, wherein the source user device comprises at least one content capturing device configured for generating the digital content;
sending a supplemental content identifier from the source user device;
sending a plurality of target identifiers from the source user device, wherein the plurality of target identifiers correspond to a plurality of target user devices; and
transmitting a plurality of digital content to a plurality of social media servers;
a processing device configured for:
identifying the plurality of social media servers associated with the plurality of target identifiers;
identifying a supplemental content based on the supplemental content identifier, wherein the supplemental content is a background audio content;
processing the digital content based on a plurality of platform characteristics corresponding to the plurality of social media servers;
embedding the supplemental content in the digital content; and
generating the plurality of digital content based on the processing;
the communication device further configured for:
sending a source indication associated with the digital content;
transmitting a content request to a source server; and
sending the digital content from the source server; and
the processing device further configured for:
identifying the source server based on the source indication.

9. The system of claim 8, wherein the plurality of target identifiers comprises a plurality of social media platform identifiers corresponding to a plurality of social media platforms, wherein a first target user device of the plurality of target user devices is associated with a first social media platform of the plurality of social media platforms, wherein a second target user device of the plurality of target user devices is associated with a second social media platform of the plurality of social media platforms.

10. The system of claim 8, wherein the plurality of target identifiers comprises a plurality of user identifiers associated with a plurality of social media platforms, wherein a first user identifier of the plurality of user identifiers is associated with a first social media platform of the plurality of social media platforms, wherein a second user identifier of the plurality of user identifiers is associated with a second social media platform of the plurality of social media platforms.

11. The system of claim 8, wherein the communication device is further configured for:
sending a plurality of authentication data from the source user device;
transmitting the plurality of authentication data to the plurality of social media servers, wherein the plurality of social media servers is configured for transmitting a plurality of authentication results based on the plurality of authentication data; and
sending the plurality of authentication results from the plurality of social media servers, wherein the transmitting of the digital content is based on the plurality of authentication results.

12. The system of claim 8, wherein the plurality of platform characteristics comprises a plurality of content formats, wherein the processing comprises transforming the digital content into the plurality of digital content based on the plurality of content formats.

13. The system of claim 8, wherein the communication device is further configured for:
sending a plurality of user feedback from the plurality of target user devices; and
transmitting an integrated user feedback to the source user device, wherein the source user device is configured for presenting the integrated user feedback, wherein the processing device is configured for generating the integrated user feedback based on the plurality of user feedback.

14. The system of claim 8, wherein the at least one content capturing device comprises a plurality of cameras, wherein the plurality of cameras comprises a front camera and a rear camera.

\* \* \* \* \*